(12) United States Patent
Budic et al.

(10) Patent No.: US 8,675,606 B2
(45) Date of Patent: Mar. 18, 2014

(54) CROSS-FREQUENCY NETWORK LOAD BALANCING

(75) Inventors: Miroslav Budic, Murphy, TX (US); Abdennaceaur Lachtar, Plano, TX (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 116 days.

(21) Appl. No.: 13/228,044

(22) Filed: Sep. 8, 2011

(65) Prior Publication Data

US 2013/0064087 A1 Mar. 14, 2013

(51) Int. Cl.
*H04W 4/00* (2009.01)

(52) U.S. Cl.
USPC .......................................................... 370/331

(58) Field of Classification Search
USPC ......... 370/320, 310, 329, 331, 332, 335, 341, 370/431, 441, 465
See application file for complete search history.

(56) References Cited

U.S. PATENT DOCUMENTS

| | | | | |
|---|---|---|---|---|
| 6,393,003 | B1 * | 5/2002 | Lee ............................. | 370/331 |
| 6,768,718 | B1 * | 7/2004 | Beshai et al. ................. | 370/237 |
| 7,318,187 | B2 * | 1/2008 | Vayanos et al. .............. | 714/776 |
| 7,403,505 | B2 * | 7/2008 | Yoon et al. ................... | 370/331 |
| 2007/0129071 | A1 * | 6/2007 | Shapira ..................... | 455/422.1 |
| 2011/0026484 | A1 * | 2/2011 | Fox et al. ..................... | 370/331 |

* cited by examiner

*Primary Examiner* — Anh Ngoc Nguyen

(57) ABSTRACT

A base station that supports different sectors and co-located different frequencies across the different sectors in a CDMA network having an Access Terminal includes a processing unit which determines a load imbalance on a connection in a first sector at a first frequency. The base station includes a network interface unit through which the processing unit offloads traffic from the connection in the first sector at the first frequency to a first or second sector at a second frequency. A method for sending traffic with a base station that supports different sectors and co-located different frequencies across the different sectors in a CDMA network having an Access Terminal including the steps of determining with a processing unit a load imbalance on a connection in a first sector at a first frequency. There is the step of offloading with the processing unit through network interface unit traffic from the connection in the first sector at the first frequency to a first or second sector at a second frequency.

20 Claims, 5 Drawing Sheets

CROSS-FREQUENCY NETWORK LOAD BALANCING

TECHNICAL FIELD

The present invention is related to a base station which offloads traffic from a connection in a first sector at a first frequency to a first or second sector at a second frequency. (As used herein, references to the "present invention" or "invention" relate to exemplary embodiments and not necessarily to every embodiment encompassed by the appended claims.) More specifically, the present invention is related to a base station which offloads traffic from a connection in a first sector at a first frequency to a first or second sector at a second frequency utilizing a load matrix that contains load information for at least a plurality of co-located frequencies as a basis to offload the traffic.

BACKGROUND

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

Network Load Balancing (NLB) Algorithm is existing 1x-EV-DO Advanced concept that provides methods of offloading traffic from the more loaded radio cells to the less loaded cell, by manipulating allowed forward link cells for every active connection but only on (one) connected frequency.

Current implementation of NLB considers traffic load on every sector in the terminal's active set (A_SET) and intelligently offloads a sector that is more loaded by moving active/connected users' serving Down-Leg (DL) to the other sectors in the A_SET that are less loaded. This improves user's forward link throughput as it is moved to the sector with less contention for the forward link scheduler-resources.

The CDMA radio network can be viewed as a two dimensional space consisting of sectors in the horizontal plane and frequencies in the vertical plane. A CDMA radio-connection must be on the same frequency, as a terminal has only one transmitter, so connection A_SET is managed across the sector/horizontal plane.

FIG. 1 depicts that arrangement. FIG. 1 shows radio resources in CDMA network.

Hence, loading imbalances are possible not only across the different sector of a base station (BTS), but also across the frequencies collocated on the same BTS.

Today, there are solutions that manage
load across sectors in connected state (NLB) AND
access to a collocated carrier (MCTA).

However with data connections expected to last longer as new real-time applications are constantly emerging, a solution is needed to extend offload decisions of the connected users into vertical/frequency plane as well (i.e. not just across the sector of the A_SET on the connected frequency, but also across other frequencies collocated in the area).

The proposed solution extends load balance to the frequency plane, while terminals are in the connected state.

In the current implementation offload for connected users is done only to the cells in the active set that are on the same frequency.

There is no solution for offload to a different frequency, for already connected users.

BRIEF SUMMARY OF THE INVENTION

The present invention pertains to a base station that supports different sectors and co-located different frequencies across the different sectors in a CDMA network having an Access Terminal. The base station comprises a processing unit which determines a load imbalance on a connection in a first sector at a first frequency. The base station comprises a network interface unit through which the processing unit offloads traffic from the connection in the first sector at the first frequency to a first or second sector at a second frequency.

The present invention pertains to a method for sending traffic with a base station that supports different sectors and co-located different frequencies across the different sectors in a CDMA network having an Access Terminal. The method comprises the steps of determining with a processing unit a load imbalance on a connection in a first sector at a first frequency. There is the step of offloading with the processing unit through network interface unit traffic from the connection in the first sector at the first frequency to a first or second sector at a second frequency.

BRIEF DESCRIPTION OF THE DRAWING

In the accompanying drawings, the preferred embodiment of the invention and preferred methods of practicing the invention are illustrated in which.

DETAILED DESCRIPTION

Figure 5:
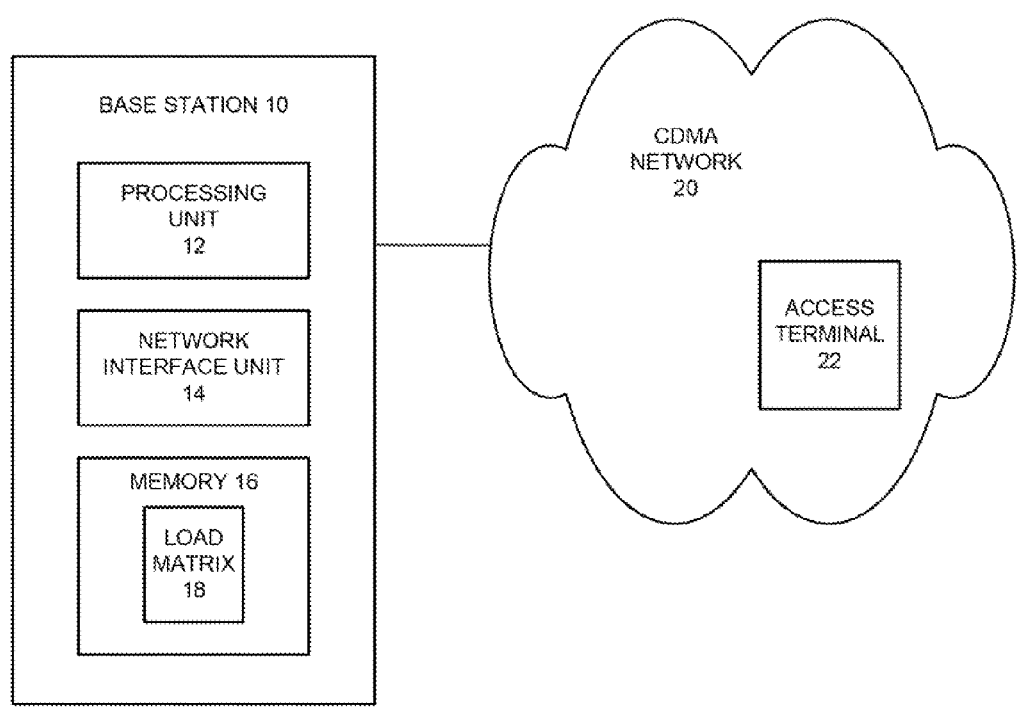
FIG. 5 is a block diagram regarding a base station of the present invention.

Referring now to the drawings wherein like reference numerals refer to similar or identical parts throughout the several views, and more specifically to FIG. 5 thereof, there is shown a base station 10 that supports different sectors and co-located different frequencies across the different sectors in a COMA network 20 having an Access terminal 22. The base station 10 comprises a processing unit 12 which determines a load imbalance on a connection in a first sector at a first frequency. The base station 10 comprises a network interface unit 14 through which the processing unit 12 offloads traffic from the connection in the first sector at the first frequency to a first or second sector at a second frequency.

The base station 10 may include a memory 16 having a load matrix 18 that contains load information for at least a plurality of co-located frequencies, the processing unit 12 using the load information in the load matrix 18 to offload the traffic. The processing unit 12 may send a Route Update Request message through the network interface unit 14 as a basis for measuring radiofrequency conditions for potential cross-frequency targets. The network interface unit 14 may receive a measurement of pilots on frequency belonging to a sector-carrier having a lowest load in the load matrix 18, and the processing unit 12 checks if any of the pilots has a signal-to-noise ratio greater than a predetermined signal-to-noise ratio.

The processing unit 12 may check if each pilot having a signal-to-noise radio greater than the threshold signal-to-noise ratio has a suitability metric greater than a predetermined suitability metric which is relative to the suitability metric of a current serving DL. For at least one pilot having a suitability metric greater than the predetermined suitability metric, the processing unit 12 may set resources on new sector-carriers and sends a Traffic Channel Assignment through the network interface to move the Access terminal 22 to the new sector-carriers reported in the Route Update Response message.

The processing unit 12 may check if a number of contending users in a current serving DL sector-frequency is higher than a predetermined level of contending users. The processing unit 12 may determine if a least loaded frequency in the load matrix 18 has a load above a predetermined load level, which is relative to the load level of a current serving DL. If the processing unit 12 determines that the number of contending users is less than the predetermined number of contending users or if the least loaded frequency in the load matrix 18 has a load above the predetermined load level, the processing unit 12 may wait a time T before checking again if the number of contending users is less than the predetermined level of contending users or if a least loaded frequency in the load matrix 18 has a load above the predetermined load level, where T is predetermined.

The present invention pertains to a method for sending traffic with a base station 10 that supports different sectors and co-located different frequencies across the different sectors in a CDMA network 20 having an Access terminal 22. The method comprises the steps of determining with a processing unit 12 a load imbalance on a connection in a first sector at a first frequency. There is the step of offloading with the processing unit 12 through network interface unit 14 traffic from the connection in the first sector at the first frequency to a first or second sector at a second frequency.

The base station 10 may include a memory 16 having a load matrix 18 that contains load information for at least a plurality of co-located frequencies, and there may be the step of the processing unit 12 using the load information in the load matrix 18 to offload the traffic. There may be the step of sending by the processing unit 12 a Route Update Request message through the network interface unit 14 as a basis for measuring radiofrequency conditions for potential cross-frequency targets. There may be the step of the network interface unit 14 receiving a measurement of pilots on frequency belonging to a sector-carrier having a lowest load in the load matrix 18, and the processing unit 12 checks if any of the pilots has a signal-to-noise ratio greater than a predetermined signal-to-noise ratio.

There may be the step of the processing unit 12 checking if each pilot having a signal-to-noise radio greater than the threshold signal-to-noise ratio has a suitability metric greater than a predetermined suitability metric which is relative to the suitability metric of a current serving DL. For at least one pilot having a suitability metric greater than the predetermined suitability metric, there may be the step of the processing unit 12 setting resources on new sector-carriers and sends a Traffic Channel Assignment through the network interface to move the Access terminal 22 to the new sector-carriers reported in the Route Update Response message.

There may be the step of the processing unit 12 checking if a number of contending users in a current serving DL sector-frequency is higher than a predetermined level of contending users. There may be the step of the processing unit 12 determining if a least loaded frequency in the load matrix 18 has a load above a predetermined load level, which is relative to the load level of a current serving DL.

If the processing unit 12 determines that the number of contending users is less than the predetermined number of contending users or if the least loaded frequency in the load matrix 18 has a load above the predetermined load level, there may be the step of the processing unit 12 waiting a time T before checking again if the number of contending users is less than the predetermined level of contending users or if a least loaded frequency in the load matrix 18 has a load above the predetermined load level, where T is predetermined.

In the operation of the invention, there is provided a technique to extend network load-balancing across all supported frequencies in the network, not just across the sectors that are on the same frequency.

This creates a two-dimensional NLB decision space consisting of sectors and frequencies, unlike one dimensional load balancing across sectors of the same frequency.

The basis of decision making is a Load Matrix 18 (LM) that BSC/RNC keeps for every connection. That matrix 18 contains load information for every collocated and potential non collocated frequency for all members of the A_SET.

The algorithm makes intelligent decisions as to when inter-frequency offload is needed and sends a Route Update Request message as a vehicle for measuring RF conditions on potential cross-frequency targets.

RNC maintains following load matrix 18-LM, where for every member of the A_SET (1, 2, . . . m) Neff (effective number of contending users) of all sector-carriers from their co-located and non-collocated sector-frequency list [(1,1), (1,2), . . . , (1,n_1), (2,1), (2,n_2) . . . , . . . (m,n_m) are recorded and tracked (minus the frequencies for sector-carriers already in A_SET).

$Neff_{x,y}$ represents average number of contending users reported by active set member's "x" combined collocated+non-collocated list entry "y".

$$LM = \begin{bmatrix} Neff_{1,2}, Neff_{1,3}, \ldots, Neff_{1,n\_1} \\ Neff_{2,2}, Neff_{2,3}, \ldots, Neff_{2,n\_2} \\ \vdots \\ Neff_{m,2}, Neff_{m,3}, \ldots, Neff_{m,n\_m} \end{bmatrix}$$

Figure 1:
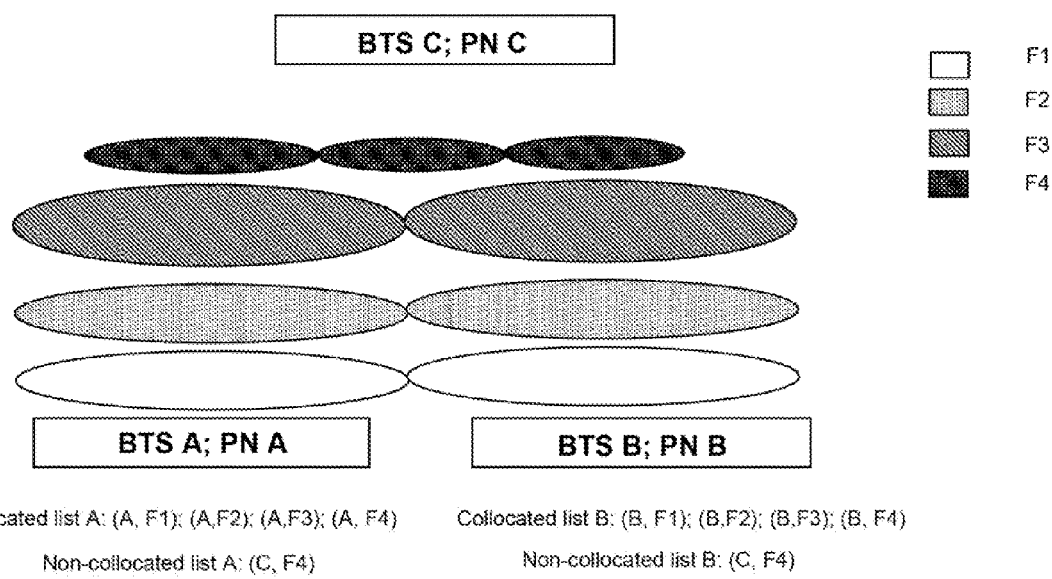
FIG. 1 shows radio resources in a CDMA network.
Figure 2:
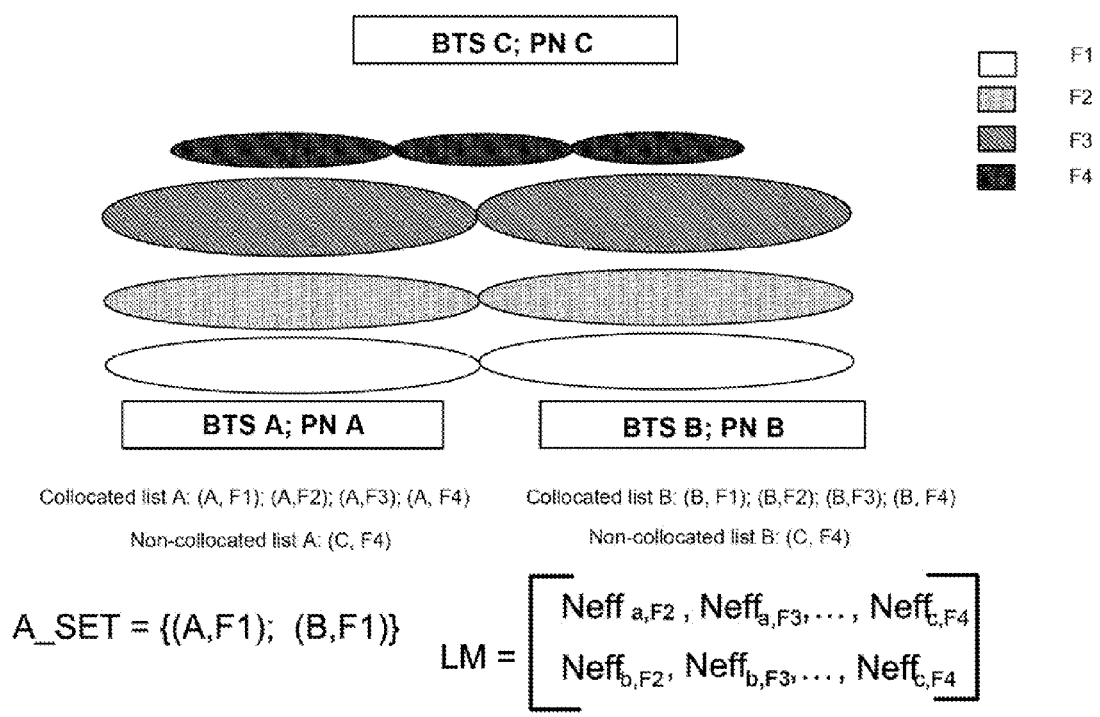
FIG. 2 shows an GM example.

One example of LM is shown on FIG. 2.

Figure 3:
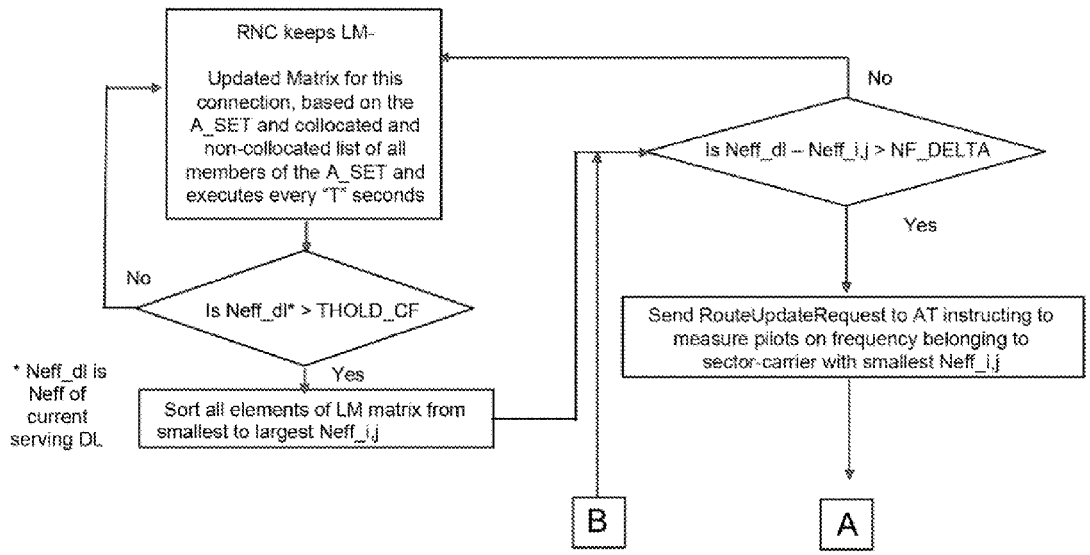
FIG. 3 shows the CFNLB algorithm—PART 1.
Figure 4:
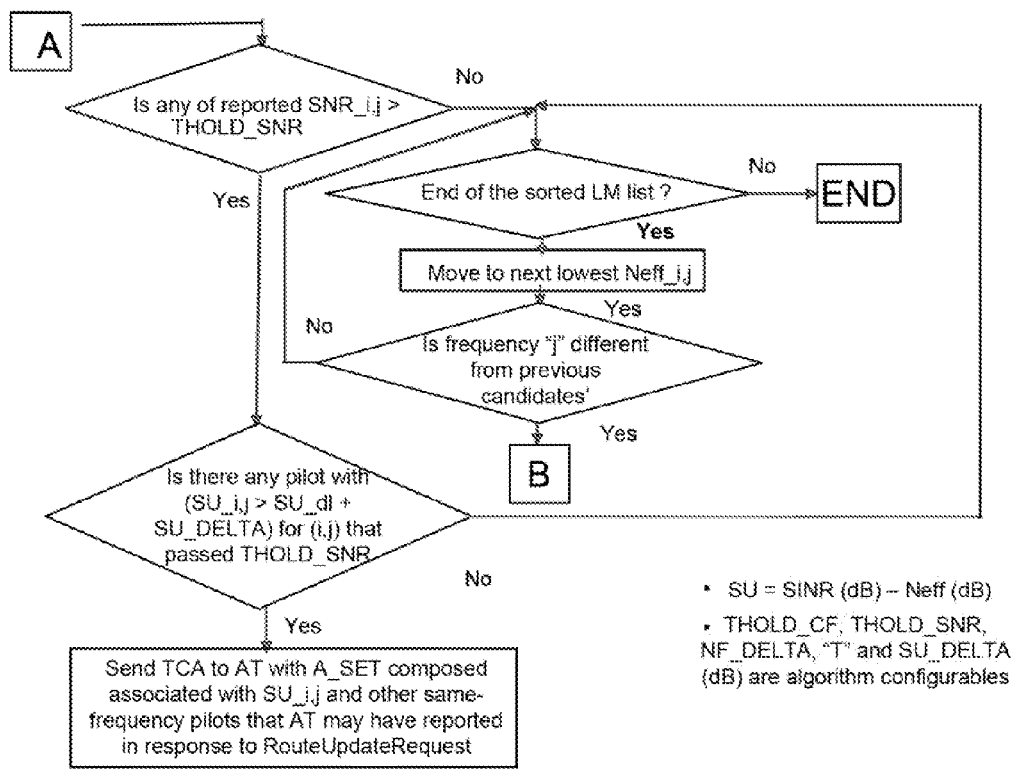
FIG. 4 shows the CFNLB algorithm—PART 2.

The flow-chart of the algorithm is give on FIGS. 3 and 4

At the core of the algorithm is maintenance of the LM matrix 18. Every sector carrier reports this to the RNC and hence RNC has this info readily available to use.

Algorithm triggers periodically every "T" seconds, where "T" is system configurable. The reason for this is to reduce required processing at the RNC and also prevent too frequent off frequency measurements.

The first thing that CFNLB checks is if number of contending users "NF_dl" in the current serving DL sector-frequency is too high, as defined by another system configurable "THOLD_CF". The idea is avoid frequent engagement of the algorithm if load on the current serving DL is low.

If case Neff_dl*<=THOLD_CF then

CFNLB stops and will not be called up for next "T" seconds.

Else

CFNLB sorts all elements of LM matrix 18 from smallest to largest Neff_ij (where Neff_ij is individual element of the LM matrix 18).

Next CFNLB checks if (Neff_dl−Neff_ij>NF_DELTA), where NF_DELTA is another system configurable.

If above condition is not true then CFNLB stops and will not be called up for next "T" seconds.

The idea is to terminate algorithm's execution if least loaded element in the LM matrix 18 is heavily loaded too, as then benefits of inter-frequency switching of a DL are not worth the trouble of off-frequency measuring and potentially inter-frequency Traffic Channel Assignment.

Else, if above condition is true. CFNLB proceeds to a next step, which is to send the RouteUpdateRequest to AT instructing it to measure pilots on frequency belonging to sector-carrier with smallest Neff_ij.

When AT comes back with the measurement, algorithm needs to check if any of the reported pilots from frequency "j" has SNR_i,j>THOLD_SNR, where THOLD_SNR is another system configurable.

If no pilots for off-channel-frequency "j" have SNR>THOLD_SNR then

CFNLB moves to the next candidate in the sorted LM list that has frequency "k" which is different from previous candidates' ("j"). If another candidate like this can be found then CFNLB moves back to checking (Neff_dl−Neff_ij>NF_DELTA) condition, for this new candidate. Otherwise, if end of the list is reached, CFNLB stops and will not be called up for next "T" seconds.

Else if there is at least one pilot from off-channel-frequency "j" that has SNR>THOLD_SNR then following condition is checked:

For every such pilot, check if (SU_ij>SU_dl+SU_DELTA) for (ij) that passed THOLD_SNR, where SU_DELTA is another system configurable and SU stands for Suitability Metric (Suitability metric is calculated as SU=SINR (dB)−Neff (dB)), then if that's the case.

RNC sets resources on new sector carriers and sends TCA to AT with A_SET composed associated with Su_ij and other same-frequency pilots that AT may have reported in response to RouteUpdateRequest. From that point on connection will be served by new set of sector-frequencies and load matrix gets recomputed, for the new set of entries.

Else, if there is no pilot for which (SU_ij>SU_dl+SU_DELTA) then CFNLB moves to next candidate in sorted LM list and proceeds from that point on as described on FIGS. 3 and 4.

The proposed solution provides better utilization of sector carrier resources and improves user forward link throughput, by directing user into sector-carrier targets with fewer contending users.

The proposed solution extends concept of NLB to frequency domain/space.

FIG. 3 shows the CFNLB algorithm—PART 1.
FIG. 4 shows the CFNLB algorithm—PART 2.
Abbreviations
1x-EV-DO 1x Evolved—Data Optimized (3g technology based on 3GPP2 specs)
A_SET Active Set; which is a list of all cells that AT is in reverse link SHO
AT Access Terminal
BSC Base Station Controller
CFNLB Cross-Frequency Network Load Balancing
DL Down Leg (i.e. RN serving AT in forward/downlink direction)
DOM Data Only Module (E/// name for RBS modem card in 1x-EV-DO)
DRC Data Rate Control
DRC Lock Data Rate Control Lock [bit]. This is how RN indicates that AT can select it for DL service
KPI Key Performance Indicators
MAHO Mobile Assisted HandOff
NLB Network Load Balancing
RN Radio Node (same as DOM)
RNC Radio Network Controller (same as BSC in 1xEV-DO)
SHO Soft Handoff
TCA Traffic Channel Assignment
THOLD THreshOLD Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A base station that supports different sectors and co-located different frequencies across the different sectors in a CDMA network having an Access Terminal comprising:
   a processing unit which determines a load imbalance on a connection in a first sector at a first frequency; and
   a network interface unit through which the processing unit offloads traffic from the connection in the first sector at the first frequency to a first or second sector at a second frequency,
   wherein the network interface unit receives a measurement of pilots on a frequency belonging to a sector-carrier and the processing unit checks if any of the pilots has a signal-to-noise ratio greater than a predetermined signal-to-noise ratio, and
   wherein the processing unit checks if each pilot having a signal-to-noise ratio greater than the predetermined signal-to-noise ratio has a suitability metric greater than a predetermined suitability metric which is relative to the suitability metric of a current serving Down Leg (DL).

2. The base station of claim 1 including a memory having a load matrix that contains load information for at least a plurality of co-located frequencies, the processing unit using the load information in the load matrix to offload the traffic.

3. The base station of claim 2 wherein the processing unit sends a Route Update Request message through the network interface unit as a basis for measuring radiofrequency conditions for potential cross-frequency targets.

4. The base station of claim 3 wherein the network interface unit receives a measurement of pilots on a frequency belonging to a sector-carrier having a lowest load in the load matrix.

5. The base station of claim 4 wherein for at least one pilot having a suitability metric greater than the predetermined suitability metric, the processing unit sets resources on new sector-carriers and sends a Traffic Channel Assignment through the network interface to move the Access Terminal to the new sector-carriers reported in the Route Update Response message.

6. The base station of claim 2 wherein the processing unit checks if a number of contending users in a current serving Down Leg (DL) sector-frequency is higher than a predetermined level of contending users.

7. The base station of claim 6 wherein the processing unit determines if a least loaded frequency in the load matrix has a load above a predetermined load level, which is relative to the load level of a current serving DL.

8. The base station of claim 7 wherein if the processing unit determines that the number of contending users is less than the predetermined number of contending users or if the least loaded frequency in the load matrix has a load above the predetermined load level, the processing unit will wait a time T before checking again if the number of contending users is less than the predetermined level of contending users or if a least loaded frequency in the load matrix has a load above the predetermined load level, where T is predetermined.

9. A method for sending traffic with a base station that supports different sectors and co-located different frequencies across the different sectors in a CDMA network having an Access Terminal comprising the steps of:
 determining with a processing unit a load imbalance on a connection in a first sector at a first frequency;
 offloading with the processing unit through a network interface unit traffic from the connection in the first sector at the first frequency to a first or second sector at a second frequency;
 the network interface unit receiving a measurement of pilots on a frequency belonging to a sector-carrier, and
 the processing unit checking if any of the pilots has a signal-to-noise ratio greater than a predetermined signal-to-noise ratio; and
 the processing unit checking if each pilot having a signal-to-noise ratio greater than the predetermined signal-to-noise ratio has a suitability metric greater than a predetermined suitability metric which is relative to the suitability metric of a current serving Down Leg (DL).

10. The method of claim 9 including a memory having a load matrix that contains load information for at least a plurality of co-located frequencies, and including the step of the processing unit using the load information in the load matrix to offload the traffic.

11. The method of claim 10 including the step of sending by the processing unit a Route Update Request message through the network interface unit as a basis for measuring radiofrequency conditions for potential cross-frequency targets.

12. The method of claim 11 including the step of the network interface unit receiving a measurement of pilots on a frequency belonging to a sector-carrier having a lowest load in the load matrix.

13. The method of claim 12 wherein for at least one pilot having a suitability metric greater than the predetermined suitability metric, there is the step of the processing unit setting resources on new sector-carriers and sends a Traffic Channel Assignment through the network interface to move the Access Terminal to the new sector-carriers reported in the Route Update Response message.

14. The method of claim 10 including the step of the processing unit checking if a number of contending users in a current serving Down Leg (DL) sector-frequency is higher than a predetermined level of contending users.

15. The method of claim 14 including the step of the processing unit determining if a least loaded frequency in the load matrix has a load above a predetermined load level, which is relative to the load level of a current serving DL.

16. The method of claim 15 wherein if the processing unit determines that the number of contending users is less than the predetermined number of contending users or if the least loaded frequency in the load matrix has a load above the predetermined load level, there is the step of the processing unit waiting a time T before checking again if the number of contending users is less than the predetermined level of contending users or if a least loaded frequency in the load matrix has a load above the predetermined load level, where T is predetermined.

17. A base station that supports different sectors and co-located different frequencies across the different sectors in a CDMA network having an Access Terminal comprising:
 a processing unit which determines a load imbalance on a connection in a first sector at a first frequency;
 a network interface unit through which the processing unit offloads traffic from the connection in the first sector at the first frequency to a first or second sector at a second frequency; and
 a memory having a load matrix that contains load information for at least a plurality of co-located frequencies,
 the processing unit using the load information in the load matrix to offload the traffic,
 the processing unit sends a Route Update Request message through the network interface unit as a basis for measuring radiofrequency conditions for potential cross-frequency targets,
 the network interface unit receives a measurement of pilots on frequency belonging to a sector-carrier having a lowest load in the load matrix, and
 the processing unit checks if any of the pilots has a signal-to-noise ratio greater than a predetermined threshold signal-to-noise ratio,
 the processing unit checks if each pilot having a signal-to-noise ratio greater than the predetermined threshold signal-to-noise ratio has a suitability metric greater than a predetermined suitability metric which is relative to the suitability metric of a current serving Down Leg (DL).

18. A base station that supports different sectors and co-located different frequencies across the different sectors in a CDMA network having an Access Terminal comprising:
 a processing unit which determines a load imbalance on a connection in a first sector at a first frequency; and
 a network interface unit through which the processing unit offloads traffic from the connection in the first sector at the first frequency to a first or second sector at a second frequency,
 the processing unit checks if a number of contending users in a current serving Down Leg (DL) sector-frequency is higher than a predetermined level of contending users,
 the processing unit determines if a least loaded frequency in the a load matrix has a load above a predetermined load level, which is relative to the load level of a current serving DL, if the processing unit determines that the number of contending users is less than the predetermined number of contending users or if the least loaded frequency in the load matrix has a load above the predetermined load level,
 the processing unit will wait a time T before checking again if the number of contending users is less than the predetermined level of contending users or if the least loaded frequency in the load matrix has a load above the predetermined load level, where T is predetermined.

19. A method for sending traffic with a base station that supports different sectors and co-located different frequencies across the different sectors in a CDMA network having an Access Terminal comprising the steps of:
 determining with a processing unit a load imbalance on a connection in a first sector at a first frequency;
 offloading with the processing unit through a network interface unit traffic from the connection in the first sector at the first frequency to a first or second sector at a second frequency;
 a memory having a load matrix that contains load information for at least a plurality of co-located frequencies, and the processing unit using the load information in the load matrix to offload the traffic;
 sending by the processing unit a Route Update Request message through the network interface unit as a basis for measuring radiofrequency conditions for potential cross-frequency targets;

the network interface unit receiving a measurement of pilots on frequency belonging to a sector-carrier having a lowest load in the load matrix, and the processing unit checks if any of the pilots has a signal-to-noise ratio greater than a predetermined threshold signal-to-noise ratio; and the processing unit checking if each pilot having a signal-to-noise ratio greater than the predetermined threshold signal-to-noise ratio has a suitability metric greater than a predetermined suitability metric which is relative to the suitability metric of a current serving Down Leg (DL).

20. A method for sending traffic with a base station that supports different sectors and co-located different frequencies across the different sectors in a CDMA network having an Access Terminal comprising the steps of:

determining with a processing unit a load imbalance on a connection in a first sector at a first frequency;

offloading with the processing unit through a network interface unit traffic from the connection in the first sector at the first frequency to a first or second sector at a second frequency; and the processing unit checking if a number of contending users in a current serving Down Leg (DL) sector-frequency is higher than a predetermined level of contending users;

the processing unit determining if a least loaded frequency in a load matrix has a load above a predetermined load level, which is relative to the load level of a current serving DL; and if the processing unit determines that the number of contending users is less than the predetermined number of contending users or if the least loaded frequency in the load matrix has a load above the predetermined load level, the processing unit waiting a time T before checking again if the number of contending users is less than the predetermined level of contending users or if a the least loaded frequency in the load matrix has a load above the predetermined load level, where T is predetermined.

* * * * *

UNITED STATES PATENT AND TRADEMARK OFFICE
CERTIFICATE OF CORRECTION

PATENT NO. : 8,675,606 B2
APPLICATION NO. : 13/228044
DATED : March 18, 2014
INVENTOR(S) : Budic et al.

Page 1 of 2

It is certified that error appears in the above-identified patent and that said Letters Patent is hereby corrected as shown below:

In the Specification

Column 1, Line 55, delete "AND" and insert -- and --, therefor.

Column 2, Line 27, delete "DRAWING" and insert -- DRAWINGS --, therefor.

Column 2, Line 33, delete "GM" and insert -- LM --, therefor.

Column 2, Line 46, delete "COMA" and insert -- CDMA --, therefor.

Column 4, Line 28, delete "(m,n_m)" and insert -- (m,n_m)] --, therefor.

Column 4, Line 43, delete "shown on" and insert -- shown in --, therefor.

Column 4, Line 44, delete "give on FIGS. 3 and 4" and insert -- given in FIGS. 3 and 4. --, therefor.

Column 4, Line 62, delete "Neff_ij (where Neff_ij" and insert -- Neff_i,j (where Neff_i,j --, therefor.

Column 4, Line 64, delete "(Neff_dl-Neff_ij>NF_DELTA)," and insert
-- (Neff_dl-Neff_i,j>NF_DELTA), --, therefor.

Column 5, Line 9, delete "Neff_ij." and insert -- Neff_i,j. --, therefor.

Column 5, Lines 16-22, delete "CFNLB moves.............seconds." and insert -- CFNLB moves to the next candidate in the sorted LM list that has frequency "k" which is different from previous candidates' ("j"). If another candidate like this can be found then CFNLB moves back to checking (Neff_dl-Neff i,j>NF_DELTA) condition, for this new candidate. Otherwise, if end of the list is reached, CFNLB stops and will not be called up for next "T" seconds. --, therefor at Line 15, after "then", as a continuation paragraph.

Signed and Sealed this
Eleventh Day of November, 2014

Michelle K. Lee
*Deputy Director of the United States Patent and Trademark Office*

Column 5, Line 25, delete "checked:" and insert -- checked. --, therefor.

Column 5, Line 26, delete "(SU_ij>SU_dl+SU_DELTA)" and insert
-- (SU_i,j>SU_dl+SU_DELTA) --, therefor.

Column 5, Line 27, delete "(ij)" and insert -- (i,j) --, therefor.

Column 5, Line 32, delete "Su_ij" and insert -- SU_i,j --, therefor.

Column 5, Line 37, delete "(SU_ij>SU_dl+" and insert -- (SU_i,j>SU_dl+ --, therefor.

Column 5, Line 39, delete "described on" and insert -- described in --, therefor.

In the Claims

Column 8, Line 38, in Claim 18, delete "in the a" and insert -- in a --, therefor.

Column 10, Line 17, in Claim 20, delete "if a the" and insert -- if the --, therefor.